(12) United States Patent
Sanghera et al.

(10) Patent No.: US 6,175,678 B1
(45) Date of Patent: Jan. 16, 2001

(54) INFRARED FIBER IMAGER

(75) Inventors: Jasbinder Sanghera, Burke; Ishwar D. Aggarwal, Springfield; Brandon Shaw, Woodbridge; Paul Pureza, Burke, all of VA (US)

(73) Assignee: The United States of Americas as represented by the Secretary of the Navy, Washington, DC (US)

( * ) Notice: Under 35 U.S.C. 154(b), the term of this patent shall be extended for 0 days.

(21) Appl. No.: 09/310,376

(22) Filed: May 12, 1999

(51) Int. Cl.$^7$ .................................................. G02B 6/04
(52) U.S. Cl. ............................. 385/116; 385/121; 385/33
(58) Field of Search .................................... 385/115, 116, 385/120, 121, 33

(56) References Cited

U.S. PATENT DOCUMENTS 3,870,399 * 3/1975 Randall et al. .................... 350/96.25
5,136,677 * 8/1992 Drexhage et al. ................... 385/123

OTHER PUBLICATIONS

Article entitled "Recent advances and trend in chalcogenide glass fiber technology: review" by Nishii et al published in JONCS in 1992.
Article entitled "IR transmission chalcogenide glass fibers" by Yamagishi obtained about 1992.

* cited by examiner

Primary Examiner—Hung N. Ngo
(74) Attorney, Agent, or Firm—John J. Karasek; George A. Kap

(57) ABSTRACT

An apparatus for performing spatial and spectral analysis comprising a bundle of a plurality of chalcogenide glass fiber, an optical system for transmitting light received from the bundle, and a detector for receiving the light signal from the optical system for providing spatial and spectral analysis of the bundle image; maximum diameter of the fibers is about the size of the pixels on the detector.

20 Claims, 4 Drawing Sheets

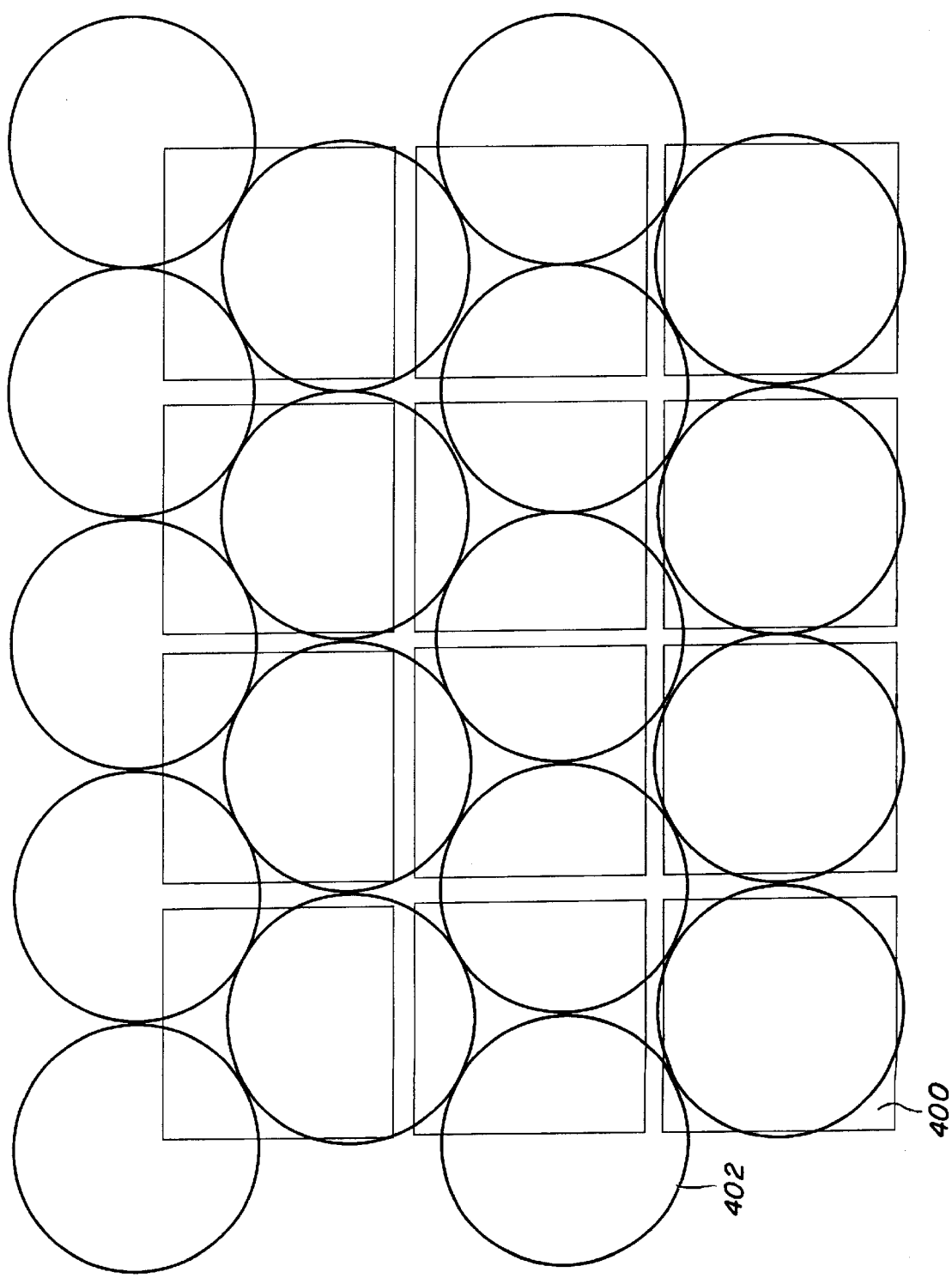

INFRARED FIBER IMAGER

BACKGROUND OF THE INVENTION

Field of the Invention

This invention pertains to an apparatus characterized by a bundle of chalcogenide fibers coupled to a detector.

Description of Related Prior Art

Infrared spectroscopy is a powerful procedure for the study of not only chemical compounds but also their relationship to surrounding molecules. Its application to tissues has been hampered by problems in sample preparation for optimal spectra acquisition and the strong absorption of infrared light by water. By resolving technical and methodological problems, it is possible to apply infrared spectroscopy to the study of human and other tissues. Thus, it is possible to demonstrate that the spectra of cancerous flesh tissues are significantly different from those of corresponding non-cancerous tissues.

Other problems of the prior art generally relate to the large size of fibers employer which made the use of a fiber bundle impractical for remote in-vivo biomedical imaging.

The article entitled "Recent Advances And Trends in Chalocogenide Fiber Technology: A Review" by Nishii et al in the Journal of Non-Crystalline Solids, 140 (1992), pp. 199–208, discloses certain aspects pertinent herein. The Nishii article discloses that infrared fiber radiometry enables one to monitor the temperature and obtain thermal images in a restricted space without interference from electromagnetic waves, microwaves, etc. The Nishii et al article discloses preparation of sulfide, selenide and telluride glass fibers for infrared optical applications. In col. 2 on p. 206 of the Nishii et al article, disclosed is a coherent fiber bundle 100 cm long with 1386 AsS fibers of 55 microns core diameter and 75 microns outside diameter of a Teflon ®) polymer cladding arranged in a hexagonal geometric pattern. Thickness of the cladding of course, was 10 microns. The fibers were arranged in rectangular pack of dimensions 2.8×3.4 mm. The fiber bundle was connected to an infrared television camera AVIO TVS-2100. The detector in the camera was an InSb crystal having sensitivity in the wavelength region between 3.0 and 5.4 microns. ZnSe and Si lenses were attached at the ends of the fiber bundle. FIG. 10 in the article shows thermal images of an operating integrated circuit delivered through the fiber bundle and directly detected by the camera.

The Yamagishi et al article entitled "IR Transmission Chalcogenide Glass Fibers", obtained about 1992, also describes certain aspects pertinent herein. The Yamagishi article also describes preparation of several chalcogenide fibers with Teflon polymer and glass cladding. The Yamagishi article discloses under the heading "Temperature monitoring and thermal imaging" a coherent AsS fiber bundle 100 cm. long with 8400 fibers, with the fibers having As S cores of 65 microns diameter and Teflon polymer cladding of 75 microns outside diameter. Based on these figures, the cladding thickness was 5 microns. The fibers were arranged in a hexagonal geometric pattern and arranged in a rectangle of dimensions 5×7 mm held together only in the vicinity of the fiber ends by an adhesive. A regular array of the fibers was achieved by controlling the fiber diameter to within ±2 microns. The fiber bundle was connected to an infrared television camera AVIO TVS-2100, with a detector of the In Sb crystal, having peak sensitivity in the wavelength region between 3 microns and 5.4 microns. The performance of the system was estimated by detecting the thermal image of an operating integrated circuit. A thermal image as low as 25° C. could be delivered clearly through the fiber bundle.

The article "Chalcogenide fiber bundle for 3D spectroscopy" by Suto in Infrared Physics and Technology, 38 (1997) 93–99, has the following Abstract: "A fiber bundle is fabricated for use in three-dimensional spectroscopy. The bundle has 100 fibers with chalcogenide glass cores (AsS) whose shape of the cutting surface is square. The fibers are arrayed 10×10, and 1×100 on the input and output side, respectively, whereby two-dimensional images are reformatted into a linear array. The output beams from fibers are dispersed by a grating and their spectra are detected simultaneously on a two-dimensional photo-detector. Preliminary results obtained by our fiber bundle are presented here."

OBJECTS AND BRIEF SUMMARY OF THE INVENTION

An object of this invention is an apparatus to perform emission spectroscopy and absorption spectroscopy in the wavelength region of about 2–12 microns.

Another object of this invention to analyze tissue in vivo using a chalcogenide fiber bundle and a detector located remotely to the tissue having spatial and spectral analysis capability.

Another object of this invention is an apparatus characterized by a chalcogenide fiber bundle and a filter, or the like, enabling the apparatus to analyze at a selected wavelength region.

Another object of this invention is an apparatus which can be used in military applications, such as threat warning systems and target detection systems, which apparatus is characterized by a chalcogenide fiber bundle and a detector.

These and other objects can be realized by an apparatus that comprises a chalcogenide fiber bundle, a detector with or without a wavelength filter or the like interposed between the fiber bundle and the detector.

DRAWINGS

A more complete appreciation of the invention will be readily obtained by reference to the following Detailed Description of the Invention and the accompanying drawings wherein.

Figure 3:
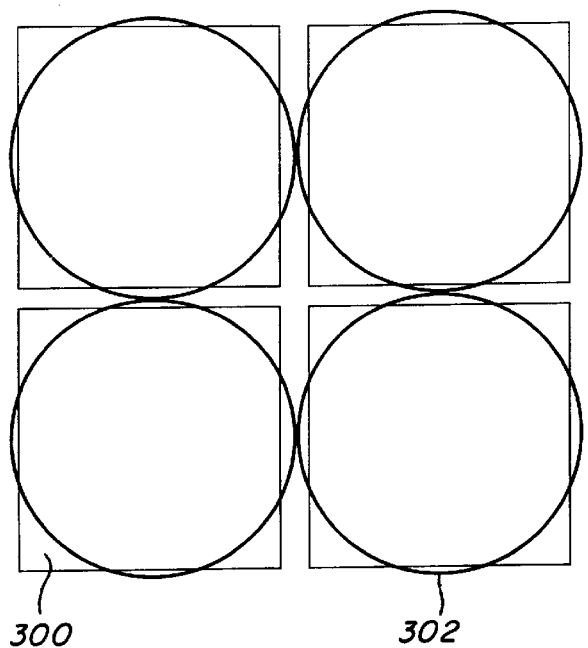

FIG. 3 schematically illustrates one fiber per pixel coupling in square fiber and pixel arrangements.

FIG. 4 schematically illustrates one fiber per pixel coupling in a square pixel arrangement and hexagonal fiber arrangement.

Figure 5:
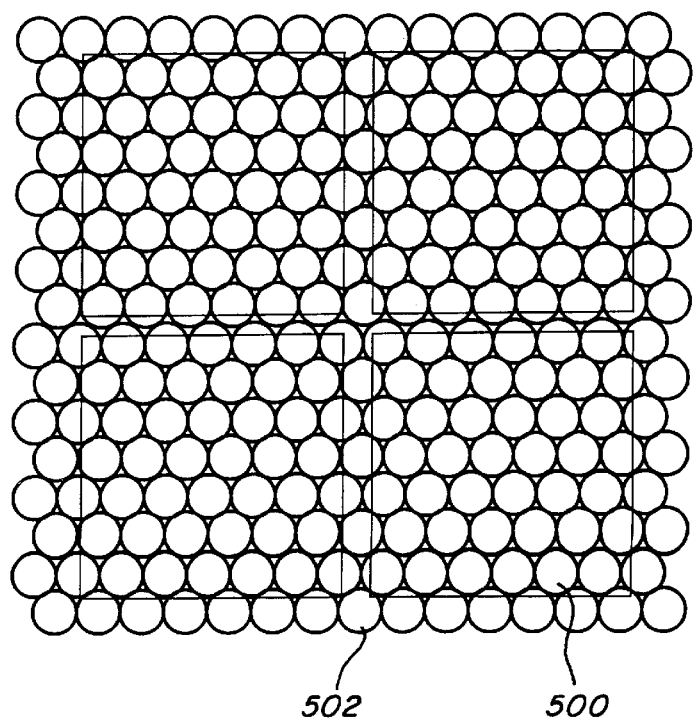

FIG. 5 schematically illustrates multiple fiber per pixel coupling in a square pixel arrangement and a hexagonal small fiber arrangement.

Figure 6:
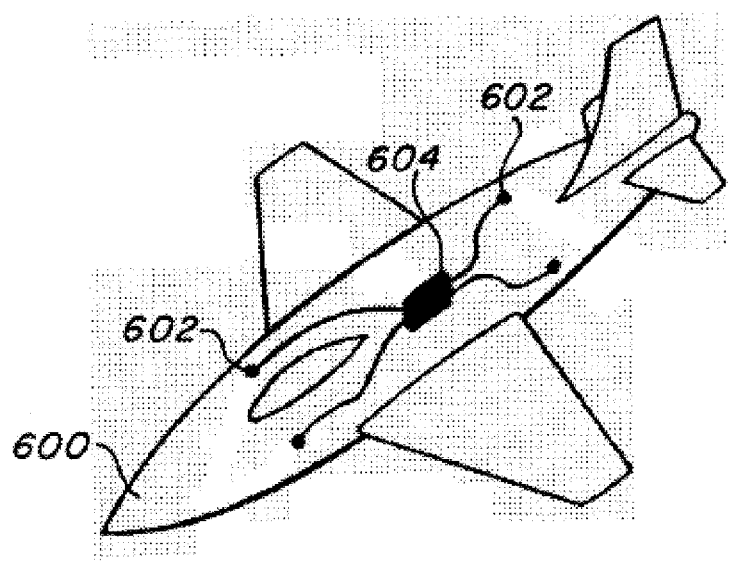

FIG. 6 is a schematic illustration of application of this invention to aircraft surveillance and/or reconnaissance.

Figure 7:
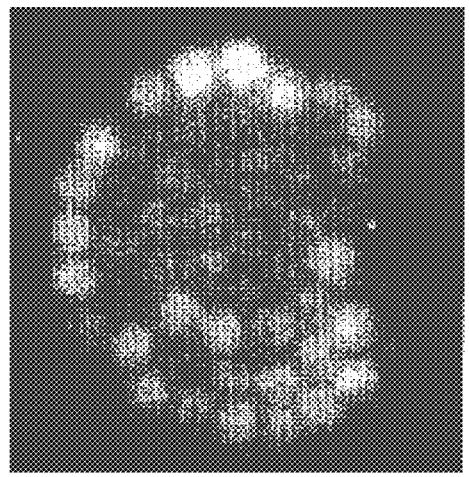

FIG. 7 is an image recorded at the output end of a chalcogenide fiber bundle of light from a laser illuminating the input end of the fiber bundle.

DESCRIPTION OF THE INVENTION

This invention pertains to an apparatus characterized by the presence of a chalcogenide fiber bundle for analyzing a tissue or for locating and/or identifying a target. The apparatus comprises a chalcogenide fiber bundle of desired length coupled to a detector with or without a bandpass filter for directing light of a certain wavelength band to a detector.

The chalcogenide fiber bundle is composed of singlemode or multimode chalcogenide glass fibers. As those skilled in the art know, chalcogenide glasses comprise at least one of the chalcogenide elements S, Se and Te and typically further include at least one of Ge, As, Sb, Tl, Pb, Ba, Si, P, Ga, In Cl, Br and I. Such glasses can also contain one or more rare earth elements. Chalcogenide glass typically contains at least 25 mole %, and more generally at least 50 mole % of one or more of the three chalcogenide elements.

The chalcogenide fibers suitable herein have maximum outside diameters which generally coincide with the size of the pixels on the detector and they are arranged in a square pack. This means that maximum outside diameter of a suitable fiber is about 35 microns. If the fiber is too large and exceeds about 35 microns, the fiber loses flexibility. For purposes herein, however, the fibers are 5–35 microns in outside diameter. If the fibers are too small and are less than about 5 microns, although their flexibility is high, their strength is low and they are subject to undue fracture. The small fibers can be reinforced by providing thereon an oxidation resistant metal coating thereon at a typical metal coating thickness of 1–10 microns, as disclosed in Sanghera et al patent application S.N. 08/885,668 filed Jun. 30, 1997. The metal coatings also protect fibers from exposure to moisture, impart durability to the fibers and protect the fibers from exposure to ultraviolet light. The glass fibers suitable herein are clad fibers with the cladding typically glass or polymer plastic cladding. The core diameter is typically 1–33, more typically 5–33 microns. If the fiber is coated, the coating is applied over the cladding.

The glass fibers can be formed into bundles in square, hexagonal or in any other geometrical arrangement, although typically, the arrangement or pack is either square or hexagonal. One fiber to one pixel, or the 1/1 square pack geometric arrangement, is defined such that the fiber bundle output is imaged onto the focal plane array such that the output from one fiber is imaged by an appropriate lens element or coupling means to one pixel on the focal plane array. If a fiber is much larger than the pixel, then use is impractical for in-vivo application since the size of the bundle would be too large to insert into a body, Also, large diameter fiber is impractical for military and other applications due to size and weight restriction on military platforms. If the fibers are about the same size as pixels and the fibers are arranged in a square pack as are the pixels, there is no blurring since there is 1/1 registry between the fibers and the pixels. There would be blurring of the image if the same fibers were arranged in a hexagonal pack.

In the instance where multiple small fibers are coupled to a single pixel, the fiber arrangement used is typically hexagonal pack, but any other arrangement can be used. In such a case, there would be no blurring since the general tenet that blurring might be present if light from one fiber is distributed to more than one pixel applies to large fibers, especially where the fiber is larger than the pixel.

Although it is desired to have as small fibers as possible since multiple small fibers can be coupled to a single pixel and the fiber bundles would not have to be limited to any particular geometric arrangement, practical considerations preclude chalcogenide fibers to have diameter much less than about 5 microns. Optical losses will be a problem for small diameter fibers, especially below 5 microns in diameter, where evanescent losses become significant. Also, another reason against smaller than the 5 micron diameter fibers is strength. Silica fibers are about two orders of magnitude stronger than the strongest chalcogenide fibers (AsS) and making chalcogenide fibers less than about 5 microns in diameter makes the fibers just too weak for this or almost any other application. Even strengthening the small fibers with a metal coating does not solve the problem. When metal coating of a small fiber is attempted in a typical manner of passing the fiber through a cup filled with molten metal with an opening at the bottom of the cup, surface tension of molten metal can prevent coating the fiber since the fiber is passed through the cup without breaking the metal surface tension and thereby not acquiring a metal coating thereon.

The small fibers can also contain imperfections or occlusions. If this happens, then light transmission through such a fiber is almost impossible since the imperfection or occlusion would block light transmission through the fiber.

Therefore, assuming a 30 micron×30 micron pixel with a 3 micron gap between adjacent pixels, fiber diameter of the fibers in a bundle is about 5–33 microns. Large fibers should be avoided since in vivo analysis of tissue is made more difficult or impractical with a larger bundle. The use of larger fibers in the bundle may defeat the purpose of having a fiber bundle coupled to a detector, such as a focal plane array. for non-invasive or minimally invasive in vivo analysis of tissue. The detector is too large for in vivo examination and typically requires close proximity to tissue or sample for analysis. The impracticality of using large diameter fibers is vividly exemplified by a fiber bundle of 512×512 fibers, which includes over a quarter million fibers. This fiber bundle arranged in square pack with 100 micron fibers, would be 51,200×51,200 microns (about 5 cm×5 cm) in size; with 5 micron fibers, this bundle would be 2,560×5,2560 microns (about 2 mm×2 mm). Where size is of paramount importance, as in vivo analysis. this difference is huge. For example, the size of the fiber bundle must be less than 3 mm to fit inside the femoral artery. Obviously, the large diameter fiber bundle cannot be used.

If the fibers in a bundle are arranged in a hexagonal pack, then the fiber outside diameter is about 5–15 microns, assuming pixels are 30×30 microns with a 3 micron gap between the pixels. If 5 micron outside diameter fibers are used and they are arranged in hexagonal pack. a total number of fibers with the area equivalent to 36 fibers will address each pixel.

The chalcogenide fiber bundle is coupled to a detector with an optical system between the bundle and the detector. Depending on the sizes of the bundle and the detector, the optical system, i.e., a lens, can be used to focus up or down light emanating from the bundle and into the detector. In an important embodiment, a collimating lens can be used to collimate light emanating from a bundle to a filter or the like, and the light from the filter or the like can be transmitted to a focusing lens and then to a detector.

Any detector can be used which provides hyperspectral information, i.e., spatial and spectral. Such a detector can be a focal plane array which is a detector consisting of pixel arranged in a square pack having a major dimension of less than about 35 microns. The focal plane array has selectivity in that each pixel is individually addressed thereby providing spatial and spectral information that is transmitted to it by one or many fibers coupled to the pixel. In certain applications, multiple bundles can be used in conjunction with one focal plane array.

Some specific examples of focal plane arrays include InSb (2–5 microns) and MCT or HgCd Te (3–11 microns) and micro-bolometer arrays.

The fiber bundle end away from the detector is used for collecting light for imaging, whether by emission (thermal) spectroscopy or absorption spectroscopy. In emission spectroscopy, the emitted light is of a range of wavelength, but in absorption spectroscopy, light of desired wavelength, such as light from a laser, is directed on the sample and the fiber detects light emitted by areas of the sample that do not absorb the directed light. In absorption spectroscopy, the fiber bundle conveys to the detector contrasting areas of the sample that scatter or absorb the directed light.

A filter is used to allow light of the desired wavelength through and block other light. A bandpass filter is suitable herein which has a typical width of about 0.1 micron. This means that the bandpass filter will allow light wavelength of, for example, 4.1–4.2 microns through and block all other light. The filter need not be used when the apparatus of this invention is used for imaging. The filter is used when wavelength selectivity is important in instances when it is desired to zero in on a particular wavelength of interest, possibly based on a data base that indicates presence of diseased or cancerous tissue. The data base would be helpful here since wavelength of diseased or cancerous tissue can be different for different organs.

Figure 1:
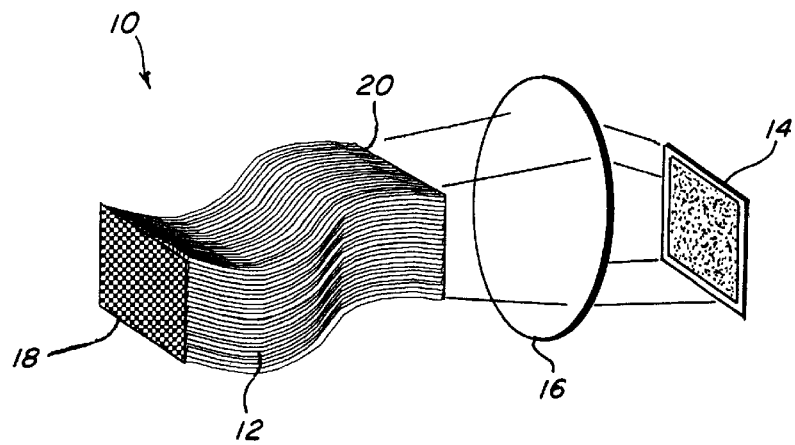
FIG. 1 is a schematic depiction of the apparatus of this invention showing a chalcogenide fiber bundle in coupled to a detector by having a lens interposed therebetween.

FIG. 1 schematically illustrates one embodiment of the apparatus of this invention 10 with chalcogenide fiber bundle 12 composed of a plurality of fibers, focal plane array detector 14 and lens 16 interposed between the bundle and the detector. The fibers in the bundle are typically arranged in square or hexagonal pack, depending on the size of the fibers relative to the size of the pixels in the detector, and the fibers can be encased in a sheath that can give particular cross-sectional shape to the bundle: Bundle end 18 comes in contact with a sample or can image a scene without making contact therewith. Bundle end 20 is coupled to lens 16 and detector 14. Lens 16 can direct light from fiber bundle 12 to highly sensitive detector 14.

Figure 2:
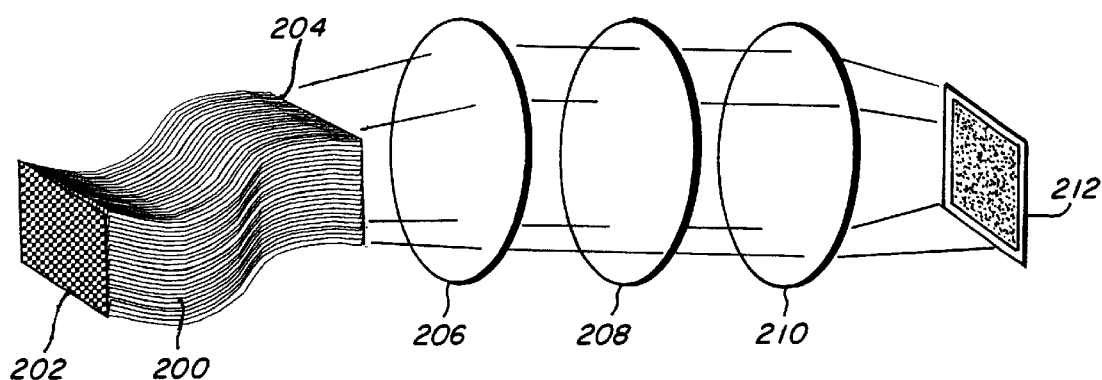
FIG. 2 is a schematic depiction of the apparatus of this invention showing a chalcogenide fiber bundle coupled to a detector and a bandpass filter, along with a lens system, interposed between the fiber bundle and the detector.

FIG. 2 is a schematic illustration of another embodiment of the apparatus of this invention. Here, fiber bundle 200 with ends 202, 204 consisting of a plurality of chalcogenide fibers arranged in a geometric pack. Bundle end 202 is used to collect light from a sample or a scene and bundle end 204 transmits the light to collimating lens 206 which collimates light and transmits it to the bandpass filter 208. Filter 208 filters light of many wavelengths and allows light of selected wavelength to pass to focusing lens 210 which directs light to focal plane array detector 212 where, with the aid of the filter, analysis can be focused on light of selected wavelength.

FIG. 3 illustrates schematically spaced rectangular pixels 300 in a square pack and chalcogenide fibers 302 superimposed on the pixels also in a square pack. The fibers and the pixels are of about the same size or, stated differently, the fiber diameter in a square pack is the same as the center-to-center distance between adjacent pixels. As shown in FIG. 3, the pixels and the fibers are in substantial registry with each other.

FIG. 4 shows spaced and rectangular pixels 400 arranged in a square pack but the fibers 402 are arranged in a hexagonal pack. The fibers and the pixels here are also of about the same size. As shown in FIG. 4, fibers in many rows are not in substantial registry with the pixels and consequent blurring or diffuse image will be detected since many pixels see light from more than one fiber.

FIG. 5 illustrates generally square pixels 500 arranged in a square pack and fibers 502 arranged in a hexagonal pack.

FIG. 6 illustrates the use of the apparatus of this invention on aircraft where more than one fiber bundle is operatively coupled to a focal plane array detector. In FIG. 6, aircraft 600 has a plurality of input apertures 602 containing the output ends of the apparatus of this invention, characterized by chalcogenide fibers coupled to a single detector (focal plane array) 604.

Having described the invention, the following example is given as a particular embodiment thereof and to demonstrate the practice and advantages thereof. It is understood that the example is given by way of illustration and is not intended to limit the specification or the claims in any manner.

Example 1

This example demonstrates transmission of light through a chalcogenide fiber bundle.

Pursuant to objectives of this example, 100 $As_{40} S_{60}$ glass fibers were formed into a coherent bundle where the fibers were in a hexagonal pack arrangement that was generally circular in cross-section. The fibers were 35 microns in outside diameter, which included Teflon polymer cladding 5 microns in thickness. The fibers were disposed in a sheath and the bundle was circular in cross-section.

The fiber bundle was illuminated at one end with a CW CO laser operating at 5.4 microns under about 4 watts of incident power and the image shown in FIG. 7 was recorded at the other end of the bundle with a Spiricon camera operating at wavelength of 3–5 microns.

While presently preferred embodiments have been shown of the novel apparatus, and of the several modifications discussed, persons skilled in this art will readily appreciate that various additional changes and modifications may be made without departing form the spirit of the invention as defined and differentiated by the following claims.

What is claimed is:

1. An apparatus comprising a bundle of a plurality of chalcogenide glass fibers arranged in a geometrical configuration, a detector comprising a plurality of pixels and an optical system between said bundle and said detector for transmitting light from said bundle to said detector, maximum size of said fibers is about the same as that of the pixels.

2. The apparatus of claim 1 wherein said fibers have a cladding thereon and said bundle transmits light in the wavelength region of about 2–12 microns and wherein said fiber bundle is coherent.

3. The apparatus of claim 2 wherein said pixels are arranged in a square geometrical pack and said detector is capable of providing spatial and spectral analysis of the signal from the bundle image.

4. The apparatus of claim 3 wherein said fibers are coupled to said pixels in an arrangement selected from the group consisting of one fiber to one pixel, multiple fibers to one pixel, and mixtures thereof; and said fibers in said bundle are disposed in a geometrical pack selected from the group consisting of square pack, hexagonal pack, and mixtures thereof.

5. The apparatus of claim 3 wherein diameter of said fibers is about 5–33 microns and said fibers in said bundle are disposed in a geometrical pack selected form the group consisting of square pack, hexagonal pack, and mixtures thereof.

6. The apparatus of claim 3 wherein diameter of said fibers in said bundle are disposed in a square geometrical shape and are about the same size as said pixels, assuming pixels on said detector are about 30×30 microns with a gap of about 3 microns between the pixels.

7. The apparatus of claim 4 including means for transmitting light of a designed narrow band.

8. The apparatus of claim 7 wherein said detector is a focal plane array.

9. The apparatus of claim 8 wherein said optical system includes a lens said lens, is a collimating lens which receives light from said bundle, the apparatus further including a bandpass filter for receiving light from said collimating lens and a focusing lens for receiving light from said bandpass filter and transmitting light from said bandpass filter to said focal plane array.

10. The apparatus of claim 9 including a sheath around said bundle.

11. An apparatus comprising a bundle of a plurality of chalcogenide glass fibers, a detector comprising a plurality of pixels, a collimating lens for receiving light from said bundle, a bandpass filter for receiving light from said collimating lens, a focusing lens for receiving light from said bandpass filter, and a detector for receiving light form said focusing lens; said pixels are about 30×30 microns with a gap of about 3 microns arranged in a square geometrical pack and maximum size of said fibers is about the same as that of a pixel.

12. The apparatus of claim 11 wherein said fibers have a cladding thereon, said bundle transmits light in the wavelength region of about 2–12 microns and wherein said fiber bundle is coherent.

13. The apparatus of claim 12 wherein said detector provides spatial and spectral analysis of light signal from said bundle image and said fibers have cladding thereon selected from the group consistent of glass, plastic and mixtures thereof.

14. The apparatus of claim 12 wherein said fibers are coupled to said pixels in an arrangement selected from the group consisting of one fiber to one pixel, multiple fibers to one pixel, and mixtures thereof; and said fibers in said bundle are disposed in a geometrical pack selected from the group consisting of square pack, hexagonal pack, and mixtures thereof.

15. The apparatus of 13 wherein diameter of said fibers is about 1–33 microns and said fibers in said bundle are disposed in a geometrical pack selected from the. group consisting of square pack, hexagonal pack, and mixtures thereof.

16. The apparatus of claim 13 wherein outside diameter of said fibers is 5–33 microns, said fibers are coupled to said pixels in an arrangement of multiple fibers to one pixel, said fibers in said bundle are in a hexagonal pack, said pixels are about 30 microns×30 microns with a gap of about 3 microns between the pixels, and said pixels are in a square pack arrangement.

17. The apparatus of 13 wherein diameter of said fibers in said bundle are disposed in a square geometrical shape, assuming pixels on said detector are about 30 microns×30 microns with a gap of about 3 microns between the pixels.

18. The apparatus of claim 14 including means for transmitting light of a narrow band and wherein said detector is a focal plane array.

19. The apparatus of 18 including multiple bundles coupled to one detector.

20. The apparatus of claim 19 wherein said bandpass filter is a wheel having a plurality of said bandpass filters mounted thereon, each filter passing light of selected wavelength region.

* * * * *